UNITED STATES PATENT OFFICE 2,442,768

METHOD OF CONDITIONING WATER

Lewis O. Gunderson, Park Ridge, Ill., assignor to Dearborn Chemical Company, Chicago, Ill., a corporation of Illinois No Drawing. Application November 24, 1939, Serial No. 305,959

21 Claims. (Cl. 252—321)

This invention relates to a method of conditioning water, as for the prevention or reduction of foaming in boilers, for the prevention or reduction of moisture entrainment in steam, for increasing the co-efficient of heat transfer in boilers, cooling equipment and heat exchange systems without producing a foaming condition, and for generally improving the character of water for use in steam boilers, heat exchange systems and the like.

One phase of this invention relates to a method of conditioning boiler water that involves the use of water soluble wetting agent. Heretofore no person skilled in the art has seriously considered the use of water soluble wetting agents in conditioning boiler feed water, for thus treated water foams excessively.

This invention further relates to a method of conditioning boiler water that involves the use of soluble compounds of heavy metals that are capable of forming inorganic micelles with the siliceous matter ordinarily present in boiler feed waters and/or boiler waters having a high foaming tendency.

This invention also relates to a method of conditioning boiler water that involves the use of relatively stable organic substances, the molecules of which form a gaseous type of film in the steam-water interface. The molecules of said organic substances comprise polar groups spaced by hydrocarbon chains. These polar groups provide a hydrophilic anchorage strong enough to prevent steam volatilization, but not so strong as to interfere unduly with the proper gaseous expansion of the organic surface film. The hydrophobic hydrocarbon chains of the molecules are thought to vibrate or oscillate in the plane of the steam-water interface. Their kinetic energy effects the expansion of the gaseous film. Such organic substances will continue to inhibit foam formation only so long as they are not chemically modified, adsorbed or volatilized, and, specifically, so long as the hydrophilic groups remain free in the aqueous phase; that is, so long as the hydrophilic groups are not adsorbed on the surface of colloidal or microscopic particles suspended or dispersed in the aqueous phase, whereby the hydrophilic anchorage is destroyed.

This invention further relates to a method of perpetuating the foam inhibiting characteristics of the hereinbelow disclosed organic compounds, by providing means for preventing more or less completely the adsorption of the hydrophilic groups of the foam inhibiting molecules on finely divided particles dispersed in the boiler water. Such means include various inorganic compounds classed as "depressants" in the art of ore flotation. It is doubtful whether any person skilled in the art has heretofore considered the use of inorganic depressants of the nature herein described in connection with the prevention of foam formation in steam boilers, heat exchangers and the like.

This invention further relates to other means for preventing more or less completely the destruction of the foam inhibiting characteristics of the special organic chemicals added for this purpose, as described in detail hereinbelow.

I have prepared many organic compounds that are exceedingly effective in inhibiting foam formation in boiler waters, more so than the conventional castor oil emulsion anti-foam preparations used heretofore. Most of these compounds are more permanently effective under boiler conditions than castor oil emulsions, due in part to the non-saponifiable and non-hydrolyzable nature of the polar groups characterizing these novel compounds. For instance, organic compounds, containing as polar groups carboxyl or ester groups, retain foam inhibiting efficiency under boiler conditions several times as long as the conventional castor oil emulsion type of preparation, which effect I have accomplished by improving the architecture of the molecule to conform to basic principles disclosed hereinbelow.

Published reports by some investigators have given the false impression that foaming of boiler water is the result of an accumulation to a certain depth of foam on top of the surface of the water, so that a stable foam layer is formed thereon. I have made numerous observations in high pressure laboratory boilers equipped with illuminated sight glasses, giving a full view of the interior of the boiler, which have thoroughly demonstrated to me that when steam is rapidly withdrawn from a boiler there is no water surface within the boiler correlated with the water level indicated in the conventional water glass attached to the boiler. In other words, there is no sharp line of demarcation between solid water and foam in the boiler during rapid steam withdrawal.

The condition of the boiler water resulting in the phenomenon called "foaming" is simply one of expansion of the water in the steam generating area in the boiler, brought about by the non-coalescence of small steam bubbles for a definite short time after their formation. In other words, the entire volume of water in the steam generating area is expanded by myriads of bubbles, until the volume of this so-called "light water" may fill the steam space and become entrained with the steam leaving the boiler. I have confirmed this mechanism of the expansion of the boiler water at 250 pounds boiler pressure by visual observations of the inside of the boiler of a large modern locomotive having several high pressure sight glasses located in the steam dome of the locomotive with two 1000 watt lamps located inside the boiler to provide ample illumination. By this means, also, I have observed how suspended matter, including calcium and magnesium carbonates and hydroxides and other inorganic and organic particles, is concentrated in the surface of the bubbles during certain periods of operation of the boiler, corresponding with fairly definite concentrations of alkali salts in the boiler water and a corresponding increase in concentration of suspended inorganic and organic particles which have entered the boiler with the feed water. At intermittent periods the positive adsorption of this suspended matter in the steam bubble surfaces appears to cease, indicating the absence of certain optimum conditions of electrolyte concentration, pH value and concentration of suspended matter which appear to be necessary to produce the "flotation" effect thought to induce foaming.

Surface-active film forming organic substances are essential for the formation of a foam. Many highly surface-active substances of a high molecular weight having terminal polar or hydrophilic groups form stable foams. Soaps are an example. Such a surface-active substance is only polarly soluble. A large hydrophobic portion (hydrocarbon tail) extends into the gaseous phase of the steam-water interface.

Not particularly stable foam, however, suffices to cause boiler foaming. The stability of bubbles need be such only as to last but a very few seconds after passing the plane of the indicated water lever in the water glass.

The basic reason for the "expansion" of boiler water by myriads of small steam bubbles to an ultimate point where the entire boiler is filled and the "light water" overflows into the steam pipe, is the fact that the steam bubbles are prevented from coalescing after formation due to some repulsive force or forces acting between individual bubbles. The presence of electrical charges of the same sign in or on individual bubbles in the body of the boiler water is a possible source of electrostatic repulsion preventing merging of the steam bubbles. I also consider the hydration of colloidal particles and molecularly dispersed substances adsorbed and oriented in the steam-water interface a major influence in preventing merging or coalescence of steam bubbles. The dipole effects of the foam forming polar molecules conceivably bring about orientation of the adjacent polar water molecules extending into the diffuse layer, forming enveloping films which not only mechanically prevent close approach and coalescence of the adjacent bubbles, but also set up electrostatic forces mutually repelling such bubbles, due to the like charges on the outside thereof, represented by the similar poles of the oriented water molecules.

Molecularly or colloidally dissolved organic matter in boiler water seldom or never acts alone in forming and stabilizing foam. A pronounced stabilizing effect is obtained only when organic matter having chemically active groups, or polar groups, such as OH, NH₂, COONa, etc., is adsorbed by mocroscopic, colloidal, or macroscopic particles dispersed in the feed water or boiler water, such as suspended soil particles, clays, alkaline earth carbonates or hydroxides, or other inert or reactive dispersed particles. The nature of the organic substance, as well as the nature of the dispersed particles, determines if adsorption takes place at all, and to what extent. Some organic substances are adsorbed highly selectively by specific particles; others are readily adsorbed by most particles.

Most finely divided inorganic solid matter dispersed in boiler water, particularly colloidally dispersed matter, is completely wetted by the water and therefore displays practically no surface-active properties. Alkaline earth carbonates and hydroxides are examples of such solids encountered in boiler feed water or boiler waters. Colloidal siliceous matter, the most soluble or hydrophilic of the colloidal dispersions, is non-surface-active.

Most organic matter in boiler feed water is too soluble or too slightly surface-active to form a surface film capable of producing foam. However, finely divided suspended particles coated more or less completely with adsorbed organic molecules, become more or less insoluble in the water. The coated particles are therefore forced into the steam-water interface, reducing the surface tension and stabilizing the surface film.

More particularly, it is thought that organic molecules with polar groups which produce solubility are adsorbed on the surface of dispersed particles, with the polar group attached to the particle surface and the hydrophobic hydrocarbon chain projecting outwardly from the surface. If additional molecules are adsorbed, it follows that the particles will soon be literally covered with hydrophobic hydrocarbon chains. The polar groups on the particle surface being effectively shut off from water contact, the consequently predominantly hydrophobic particle is forced into the more compatible steam-water interface, where the particle will lie partly in the aqueous phase and partly in the steam phase. Some of the particles may be "floated" by the attachment of only a few molecules having relatively long hydrocarbon chains. Other more highly surface-active molecules may be oriented in the interface with free polar groups in the aqueous phase. Thus, a very heterogeneous surface film is formed, which is most conducive to foam formation. An interlaced structure may be realized, giving the film elasticity and tenacity and permitting local variations in surface tension without rupture.

Other particles may adsorb so many organic molecules that the particles will be entirely coated with hydrophobic hydrocarbon chains. Such particles will concentrate in the steam-water interface, even though not attracted by the aqueous phase. These particles serve to stabilize the surface film by creating a very heterogeneous type of film, increasing the viscosity of the film, and likely acting as a sort of insulation between adjacent steam bubbles to prevent chemical reaction between active groups in adjacent films; in effect producing a sort of armor, similar to that produced by particles of mineral coating the bubbles in ore flotation, and thereby stabilizing them.

It is found in the art of ore flotation that certain flotation agents or collectors will be adsorbed by the mineral particles most efficiently at definite pH values and electrolyte concentrations. At other pH values and electrolyte concentrations, such adsorption will fail to take place.

Likewise, in foam formation, adsorption of the more or less soluble organic substances in the boiler feed water or boiler water will occur most efficiently under such specific conditions, being also influenced greatly by the presence or absence of very small amounts of certain substances, which in some cases serve as "activators" and in other cases serve as "depressants."

For instance, we find in some localities that the available feed water supplies are of such nature that when a concentration of 150 grains to 200 grains per gallon of total dissolved solids is attained in the boiler water foaming occurs at a definite rate of steam takeoff, the initial effective concentration depending in part on the pH of the boiler water, in part on the nature and amount of suspended particles, the nature and amount of organic matter in the water, and a great deal upon the nature and amount of the inorganic substances molecularly and colloidally dispersed therein.

In other localities, boiler water concentrations many times the above figure are attainable before foaming occurs, or no foaming whatever may occur except at intervals when certain of the factors mentioned are causing temporary or more or less permanent adsorption of surface-active substances and concentration of solid particles in the steam-water interface.

Foaming may occur when certain feed waters enter the boiler and are mixed with the boiler water, whereby the organic matter in one water is actively adsorbed by the particular suspended particles or colloidal matter in the other water, or vice versa. In either case, surface-activity of both substances is increased, bringing about conditions favorable for foam formation.

Two or more types of organic matter of different characteristics may conceivably interact to mutually reduce the solubility, thus increasing adsorption in the steam-water interface, favoring foam formation.

In the process of ore flotation certain inorganic agents may be added that have a depressing action on said flotation agents or collectors, preventing them from being adsorbed by certain mineral particles. I have found that foam formation may be prevented in a similar manner by adding depressing agents, which prevent the adsorption of surface-active organic substances on finely divided suspended particles in the boiler feed water or boiler water.

For instance, assuming that finely divided dispersed calcium carbonate is the principal adsorbent, it is found that the adsorption of many organic substances is greatly "depressed," if not prevented, by the addition of small amounts of "depressants," such as soluble compounds of the heavy metals, particularly manganese, thorium, tin, zirconium, molybdenum, lead, zinc, copper, iron, tungsten, cadmium, mercury, antimony, bismuth, and titanium. Heavy metal compounds such as manganous sulfate, sodium dichromate, zirconium nitrate, carboxylic acids such as citric, tartaric, succinic and the like, and siliceous matter, particularly in the form of hydrated micelles are particularly effective as depressants. In fact, the inorganic compounds are effective, I believe, primarily because of the resulting formation of highly hydrated micelles with dissolved siliceous compounds present in all natural feed waters.

Other inorganic depressing agents that are effective in preventing adsorption of my special foam inhibiting chemicals (as well as of the dissolved foam forming organic substances in the boiler feed water) on the precipitated and colloidal alkaline earth carbonates and hydroxides, and other dispersed particles, include fluosilicic acid, sodium fluosilicate, potassium fluosilicate, ammonium fluosilicate, and to some extent the calcium and magnesium fluosilicates.

Also, high concentrations of alkali and of sodium sulfate act as depressants for calcium carbonate, although not so efficiently as the inorganic micelles just mentioned. When these depressing agents are used in conjunction with my special organic foam inhibiting chemicals, permanent inhibition of foam formation is established, providing the depressants effectively prevent the adsorption of the special organic foam inhibitor by the dispersed particles. In the presence of these depressing agents the colloidal particles will remain wetted by the water and will eventually be flocculated because of subsequent dehydration or because of agglomeration, and thus will not be further available for stabilizing foam.

Besides the inorganic micelles, which may be considered as depressants of the hydrophilic colloid type, other hydrophilic colloids of the organic type may be used, for instance, lignin, tannin, dextrin, and various gums, in particular, to cope with specific types of organic substances. The inorganic or complex organic-inorganic micelles have a distinct advantage for use in conventional alkaline boiler feed water wherein the micelles are unusually stable. These organic "protective colloid" materials are useful as emulsion vehicles for the foam inhibiting substances described hereinbelow.

Other compounds include the "glassy" phosphates and arsenates, such as the metaphosphates and tetraphosphates and the meta and tetra-arsenates. However, I find that the effectiveness of such compounds is reduced or lost when attempts are made to use these anionic substances in boiler feed waters of the type found in large sections of the country west of the Mississippi River and in the west coast territory, having a considerable content of "soil colloids," including siliceous micelles and organic micelles (humus complexes, lignin, etc.). In addition, the soluubilizing effect that these inorganic compounds ordinarily have on the calcium carbonate is also very greatly reduced or entirely lost.

It appears possible that these anionic compounds somehow form a more "dehydrated" micelle than is formed by the cationic metal compounds referred to hereinabove. As a result, the addition of such anionic inorganic compounds in certain waters, instead of preventing encrustation of boiler feed water pipe lines, injectors, feed water pumps, feed water heaters, heat exchangers and the like, may actually accentuate the encrustation of such appurtenances with calcium carbonate deposits. Therefore, although I have conceived the possible utilization in some instances of these anionic compounds in conjunction with my organic foam inhibiting chemical, I do not consider such use of anionic compounds to be a preferred embodiment of my invention.

The above disclosed depressants are apparently effective on most, if not all, of the usual dispersed solid matter in boiler feed water or boiler water, and on the usual active polar groups in the surface-active organic substances discussed herein, providing other factors are favorable.

The depressant action is apparently less effective at certain boiler water concentrations, or conversely, the adsorption of organic substances on particles is perhaps most pronounced at certain favorable conditions of electrolyte concentration, pH value, concentration of suspended solids, and the like, when adsorption defies ordinary depressants and foam formation occurs. Under such conditions a highly surface-active foam inhibiting chemical is best added until adsorption is depressed or until foam forming organic matter has been flocculated. The carboxylic acids, such as citric, tartaric and the like, are effective depressing agents even at low saline concentrations.

The use of depressants, therefore, provides a practical solution of the foam problem, if enough of such depressants is provided at the start of a build-up in concentration, such as after a washout or water change, to prevent initiation of adsorption of organic polar molecules on dispersed particles. Once such adsorption occurs it appears that the "depressing agents" are unable to disrupt the union to thus solubilize the constituents of the surface-active adsorption product.

The above theory involving selective adsorption and depressant action of various agents added to the boiler feed water or boiler water has been substantiated by experiments, showing how the addition of such agents increases the effective "life" or permanence of the various organic foam inhibiting chemicals described hereinbelow, which, even though they stand up under boiler conditions without breaking down, yet are subject to more or less rapid adsorption on dispersed particles in the boiler water. Such adsorption "deactivates" the inhibitors, requiring the addition of more of the foam inhibiting substance and preventing the attainment of a permanently non-foaming boiler water.

I have found that in some cases water soluble wetting agents are effective as depressants to inhibit adsorption of foam forming organic substances on finely divided suspended particles in the boiler water.

The term "water soluble wetting agents" as used in this application relates to compounds such as fatty alcohol sulfates, sulfated fatty acid amides, sulfated fatty acid esters, secondary alcohol sulfates, sulfated esters of higher alcohols and dibasic acids, alkylaryl sulfonates, sulfonated esters of alcohols and dibasic acids, sulfonated aliphatic esters, sulfated and sulfonated rosin acids, sulfonated aromatic ethers, and other water soluble sulfated or sulfonated organic compounds, part esters of polyhydric alcohols and fatty acids, ethanolamides of fatty acids, phosphated or phosphorated unsaturated fatty acids, and other compounds characterized by their ability to reduce the surface tension of water and to increase the wetting, penetrating, dispersing and foaming ability of water. Many other organic substances comprising both hydrophilic and hydrophobic groups, such as aliphatic and aromatic quaternary compounds, share these characteristics of water soluble wetting agents, although to a less marked degree.

Beneficial results are obtained by using with the organic foam inhibiting compounds such other substances as soaps, tannins, lignins, dextrin, glucosides, gums, and like "protective colloids," humic acid derivatives, proteins and the products of their decomposition, such as various amino acid salts, amides, the salts of certain amines, and the like.

Although wetting agents if added to boiler feed water alone act as foam producing agents, I find no such effect when they are added in conjunction with my special organic foam inhibiting compounds. In fact, the foam inhibiting characteristics of my special compounds are in some cases improved, possibly due to the action of the wetting agent on the dispersed particles to prevent adsorption thereon of the foam inhibiting chemical. In using these depressants for the purpose indicated, I prefer to add small amounts of these chemicals to the boiler feed water after boiler washout or boiler water changes, so that the conditioning effect will be initiated at the beginning of the concentration cycle in the boiler water. Foam inhibition will then begin immediately and will be permanent.

However, these depressing agents cannot be expected to function satisfactorily if added by themselves to boiler water that is already in a foaming condition, because they are not able to displace the adsorbed organic foam forming molecules from the colloidal particles. In the case of boiler water already in a foaming condition, I add one of my special foam inhibiting chemicals described hereinbelow, together with a depressing agent. The foam inhibiting chemical displaces the foam forming surface-active substances from the steam-water interface. The depressing agent prevents adsorption of the foam inhibiting chemical on the dispersed particles in the aqueous phase and thus prevents deactivation of the foam inhibitor. By these means my foam inhibiting chemicals completely destroy foam and inhibit further foam formation, remaining effective more or less permanently because of the very slight adsorption of these chemicals by colloidal dispersed matter, adsorption in some cases being entirely inhibited by the depressing agent. One or more of the depressing agents may be used in the same feed water to inhibit adsorption of the foam inhibiting chemicals on the various types of dispersed particles.

I have found that the depressing agents described above, particularly micelles such as the silica-heavy metal oxide or hydroxide hydrosols, and the complexes formed between these inorganic micelles and organic micelles, such as certain lignins, tannins and related organic substances, are very effective in preventing adsorption of the foam forming type of organic substances in the boiler feed waters on dispersed particles therein, thus preventing the production of surface-active foam producing substances in the boiler water. Although I have been able to permanently inhibit foam formation by the use of such depressing agents alone, I find that under certain critical conditions adsorption of foam forming organic matter on dispersed particles may occur nevertheless, resulting in spontaneous foam development at certain concentrations of electrolytes and with certain values of pH in the boiler water. I therefore find it expedient to use my foam inhibiting organic chemicals together with the depressing agents, thereby assuring that foaming of the boiler does not occur during the period when the depressing agents are ineffective in preventing adsorption of the organic foam forming substances on the dispersed particles. Therefore, it is understood that foam inhibition may be accomplished by the use of the inorganic or organic-inorganic micelles alone, or other depressants alone, as well as by the use of only the special foam inhibiting type of chemicals described herein. The preferred embodiment is the combination of the foam inhibitor chemicals and the depressants described herein.

The depressants may also be used in conjunction with conventional anti-foam compositions comprising castor oil.

Besides the organic depressants mentioned above, I may use other compounds such as triethanol amine, diethylene glycol, triethylene glycol, trimethyl phosphate, and the like, in the boiler feed water entering the boiler, to prevent adsorption of the foam inhibiting chemical on the dispersed particles. Any one of these substances may be added by dissolving in the feed water, or by intermittent direct injection into the boiler.

Foam inhibition

I have found that the foaming of boiler water containing foam producing substances can be inhibited by the addition of predominantly hydrophobic organic substances comprising polar groups spaced by an intermediate chain of at least 6 and preferably 10 or more carbon atoms. Said polar groups have long side chains or end chains of 8 or more carbon atoms, the exact number of carbon atoms depending in part upon the hydrophilic potency of the polar groups and in part upon the number of polar groups in the molecule and the spacing thereof. Such substances are capable of forming characteristic discontinuous interfacial films, or so-called gaseous type of films, of predominantly hydrophobic nature, wherein the molecules are oriented substantially horizontally in the plane of the interface. This type of surface film is characteristically very thin, in comparison with the relatively thick film characterizing the steam-water interface in a foaming boiler water.

The foam inhibiting effect is powerful enough to overcome even the strong tendency to foaming induced by water soluble wetting agents, extremely minute quantities of foam inhibiting substances being sufficient for this purpose. The following hypotheses are offered as possible explanations for the surprisingly great foam inhibiting effect of the substances disclosed hereinbelow. The merits of the present invention, however, do not in any manner hinge on the correctness of these hypotheses.

The foam inhibiting substances of the present invention comprise both hydrophobic and hydrophilic groups and consequently tend to accumulate in the water-steam interface. Due to the presence of spaced hydrophilic groups, molecular orientation parallel to the plane of the interface is effected. The predominantly hydrophobic nature of the interfacial film formed by these molecules precludes formation of a layer of polarly oriented water molecules. The most efficient of these foam inhibiting substances are those that are most highly surface-active and at the same time have sufficient hydrophilic characteristics to prevent steam volatilization. The hydrophilic and hydrophobic portions of said molecules are also so proportioned as to not only provide these two important characteristics but to also permit the maximum freedom of movement of the hydrocarbon side chains and end chains attached to these polar groups. These molecules are thus permitted to exert the maximum kinetic energy in two dimensions of the steam-water interface, whereby maximum lateral displacement of these and other surface-active molecules in the interface is accomplished. In other words, the most efficient foam inhibiting compound is one that produces a gaseous film of greatest expansion consistent with firm anchorage to the aqueous phase to preclude steam volatilization. The efficacy of this foam inhibiting surface film is not necessarily dependent upon exclusive occupation of the steam-water interface by the foam inhibiting chemical. The interface may conceivably be shared with strongly surface-active substances that may be more or less vertically oriented in this interface. The net result is the production of a predominantly hydrophobic type of interfacial film, wherein the hydration effect is reduced to a minimum and the electrical charges of the surface film are likewise reduced to a minimum, thus removing the two repelling influences preventing coalescence of steam bubbles. This hypothesis will also explain why only minute quantities of foam inhibiting substances are required. The polar groups of these compounds are preferably of the non-saponifiable, non-hydrolyzable type, to enhance their chemical stability under boiler conditions, wherein high temperatures and high alkalinity obtain. For instance, polar groups such as OH, $NH_2$, $OSO_3Na$, $SO_3Na$, and aliphatic and aromatic quaternary ammonium groups may be used, particularly in the alkyl long chain derivatives thereof.

Organic foam inhibitors

A surface film formed by horizontally oriented molecules is in many cases not sufficiently hydrophobic and dynamic to form the desired exclusive gaseous type of film.

Foam inhibiting substances which are substantially horizontally oriented in the steam-water interface, due to polar groups spaced far apart in the molecule, may be provided with relatively short alkyl chains attached to the various polar groups. These substances are effective under relatively low temperature conditions and will prevent the foaming of the boiler water at high temperatures if the water is not excessively contaminated with organic surface-active substances. Such compounds comprising short alkyl chains are particularly effective under atmospheric conditions and are very suitable for use as foam inhibitors, especially in conjunction with wetting agents, in automobile radiators, Diesel engines, evaporators, and the like. Dibutyl sebacate is a very effective foam inhibitor of this type.

I have also found that long alkyl or hydrocarbon chains containing at least 8 carbon atoms are preferable, if not necessary, to inhibit foam formation by highly surface-active organic substances having molecules that orient substantially vertically in the steam-water interface, especially at high temperatures and where the concentration of these organic substances is relatively high. The provision of the longer chains attached to the polar groups requires that the polar groups be more strongly hydrophilic.

I have further discovered that highly izonized polar groups are most effective. They will also permit the attachment of alkyl chains or hydrocarbon chains of greater length and in greater number. The kinetic energy of these polar groups, being very great, effect vigorous oscillations of the molecule and particularly of the hydrocarbon chains, in two dimensions in the steam-water interface. The result is the mutual lateral displacement of the surface-active molecules, thus producing a gaseous film of maximum expansion. I shall term this type of surface film a "dynamic" foam inhibiting type of surface film.

Also, I find it advantageous to utilize large or complex molecules that normally occupy a relatively large surface area by virtue of horizontal orientation of a long main chain and secondary branch chains. The latter comprise at least 8 carbon atoms and spaced polar groups together with hydrocarbon side or end chains having at least 8 carbon atoms attached to the polar groups. In order to provide the maximum effectiveness, some of the polar groups must be spaced far apart in the molecule. It is also permissible in large complex molecules to have a grouping of polar groups close together to effect the necessary hydrophilic anchorage to balance the increased hydrophobic portion of the molecule. The long branch chains may have additional polar groups separated from the main hydrophilic anchorage, preferably by 10 or more carbon atoms. The polar groups in the branch chains will have attached long alkyl chains, comprising 16 or more carbon atoms. I have found that such long alkyl chains are effective in producing greater expansion of the film and are conducive to bringing about more exclusive occupancy of the steam-water interface by the foam inhibiting molecules.

If a polar group is one of relatively weak hydrophilic character, such as an ether group, it is well to provide an additional polar group such as an hydroxyl group or a double bond attached to an adjacent carbon atom.

The only presently used commercially foam inhibiting substance is castor oil emulsion, which has limited temporary effectiveness. The most vulnerable point of attack of the castor oil molecule is the double bond closely adjacent to an hydroxyl group, which arrangement favors decomposition under high boiler temperatures, especially in the presence of alkaline boiler water. Further more, the glyceryl short chain ester groups will soon saponify under such conditions as obtain in conventionally softened alkaline boiler water. My organic foam inhibitors are relatively more stable than castor oil under boiler conditions.

My experiments have shown that saponification of the ester groups does not occur within so short a time as three or four minutes in conventional boiler water. The loss of effectiveness of castor oil emulsions as foam inhibitors in such boiler water within three or four minutes is not due to saponification but rather to disruption of the molecule at the double bond adjacent to the hydroxyl group. I have overcome this weakness by alkylation of the hydroxyl group, adding a long hydrocarbon chain containing, for instance, 16 carbon atoms, which stabilizes the compound. The resulting compound, glyceryl-tri-ester of 12-cetoxy-9 octadecenoic acid is a greatly improved and far more permanently efficient foam inhibitor.

This treatment is applicable to any similar unsaturated oil or organic compound having polar groups closely adjacent double bonds in long fatty chains, wherein at least one strong polar group is separated from any other polar group or double bond by at least 9 carbon atoms.

I also provide a non-hydrolyzable polar end group, such as an amine, instead of the saponifiable ester linkage. The resulting compound (9-octadecene-12-cetyloxy-1-amine) is a foam inhibitor. I have improved its efficiency by reacting it with an alkyl halide to introduce a long alkyl chain, such as 16 carbons, producing 9-octadecene-12-cetyloxy-1-cetyl amine. I have again very greatly improved the foam inhibiting property of the above compounds by reacting each of them with a polyhalogen hydrocarbon, such as tribrompropane, thus producing a compound, the skeleton structure of whose molecules is similar to castor oil, except that the glycerol ester group is replaced by 1,2,3,-triamino-propane, and additional long alkyl side chains have been added to the hydroxy group at carbon 12 and to the amino group. The respective compounds formed are:

Tri-(9-octadecene-12-cetyloxy-1-imino) propane

CH₃-(CH₂)₅-CH(OC₁₆H₃₃)-CH₂-CH:CH-(CH₂)₇-CH₂-NH-CH₂
CH₃-(CH₂)₅-CH(OC₁₆H₃₃)-CH₂-CH:CH-(CH₂)₇-CH₂-NH-CH
CH₃-(CH₂)₅-CH(OC₁₆H₃₃)-CH₂-CH:CH-(CH₂)₇-CH₂-NH-CH₂

Tri-(9-octadecene-12-cetyloxy-1-cetyl imino) propane

CH₃-(CH₂)₅-CH(OC₁₆H₃₃)—CH₂—CH:CH—(CH₂)₇—CH₂—(NC₁₆H₃₃)—CH₂
CH₃-(CH₂)₅-CH(OC₁₆H₃₃)—CH₂—CH:CH—(CH₂)₇—CH₂—(NC₁₆H₃₃)—CH
CH₃-(CH₂)₅-CH(OC₁₆H₃₃)—CH₂—CH:CH—(CH₂)₇—CH₂—(NC₁₆H₃₃)—CH₂

Besides reacting the above aminated unsaturated hydrocarbon with tribrompropane, I also find it even more advantageous to react these amines with other halogenated hydrocarbons where the halogen groups are spaced farther apart, such as 5 or 6 carbons apart. A compound with 15 or more carbon atoms brings about a greater spreading of the molecule and a corresponding greater expansion of the surface film with equal weights of substance. A suitable halogenated hydrocarbon for this reaction is represented by 1,6,11,16-heptadecanetetra bromide.

Also, the amino compounds described above may be reacted with a mono or poly-cyclic poly-halide, having halogen atoms well distributed around the ring or rings so that the principal chains of the resulting compound will radiate from the mono-cyclic or poly-cyclic compound similarly to the spokes of a wheel. The principal chains may have additional side chains attached to spaced polar groups to produce substantial horizontal orientation of the molecule in the steam-water interface. A simple representative of a compound of this nature is tri-(9-octadecene-12-cetyloxy-1-imino) 1,3,5-benzene.

CH₃(CH₂)₅-CH(OC₁₆H₃₃)-CH₂-CH:CH-(CH₂)₇-NH

CH₃(CH₂)₅-CH(OC₁₆H₃₃)-CH₂-CH:CH-(CH₂)₇-NH
CH₃(CH₂)₅-CH(OC₁₆H₃₃)-CH₂-CH:CH-(CH₂)₇-NH

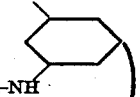

A further improvement over the above described complex long chain alkoxy, long chain alkylamino compounds has been brought about by the preparation of the corresponding quaternary compounds. These are prepared by alkylating ricinoleic acid, converting to the acid amide and reducing to the amine, which is then further reacted with a short chain alkyl halide, such as methyl iodide, to produce the dimethyl derivative. This amino compound is then reacted with tribrompropane or other halogenated aliphatic or aromatic compounds, to produce a foam inhibiting complex branched quaternary compound, such as tri-(9-octadecene-12-cetyloxy-1-dimethyl ammonium bromide) propane.

I find that I can increase the foam inhibiting effectiveness of the highly ionized quaternary compounds by providing an additional long alkyl chain (cetyl) in the quaternary group forming 9-octadecene-12-cetoxy-1-dimethyl cetyl ammonium bromide, which is then reacted with the desired halogenated hydrocarbon, such as 1,4,7-bromoheptane, producing a compound of the type tri-(9-octadecene-12-cetyloxy-1-methyl cetyl ammonium bromide) 1,4,7-heptane.

ond hydrocarbon chain comprising at least 12 carbon atoms attached to said polar group.

In place of amino groups in the compounds shown above, I can substitute two covalent polar groups, such as hydrazine (—NH—NH$_2$), and sulfonamide (—SO$_2$—NH$_2$) groups. Or a combination of any two or more hydrophilic groups may be utilized, together with their substituted

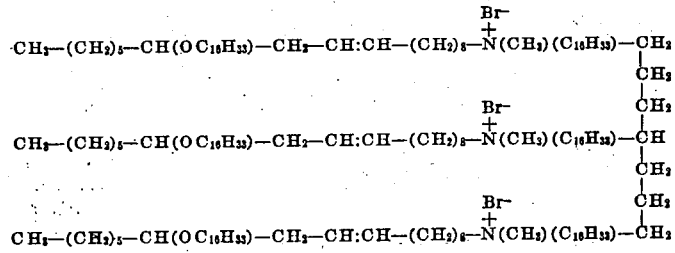

Further methyl groups in both of the above compounds may be replaced by long chain groups such as cetyl, lauryl or the like. These compounds have quaternary polar groups which are ionized and strongly hydrophilic and therefore serve as pivotal points around which three branch chains oscillate. Each of these branch chains is in part horizontally oriented in the steam-water interface by virtue of spaced polar groups with long side chains. Each of said polar groups is separated from a double bond by two carbon atoms, which double bond, whether or not converted to an hydroxyl group in the hot alkaline boiler water solution, contributes hydrophilic properties to reinforce the polar group attached to the long alkyl chain. My researches have indicated that this double linkage in close proximity to the long chain alkoxy group in the molecule provides increased foam inhibiting properties.

In the above compounds, I have provided side chains having 16 carbon atoms, each attached to polar groups far separated in the molecule. Polar groups in the quaternary type are highly ionized, providing maximum kinetic energy for the oscillation of the molecule as a whole and the branch chains. The kinetic energy of the other polar groups has been accentuated by having a double bond in close proximity thereto. It is obvious that other more complex compounds of this character can be prepared that will require smaller amounts of material to produce the desired foam inhibiting effect.

Although I have herein described preferred foam inhibiting compounds as prepared from a basic natural product such as ricinoleic acid, I am aware that similar compounds can be prepared synthetically. Straight chain or branched unsaturated hydrocarbons may be halogenated and provided with desired polar groups to which may be attached long branch chains having additional polar groups spaced 8 or more carbons apart with long alkyl chains attached to thus provide a molecular structure fundamentally similar to the compounds described above.

Compounds thus prepared synthetically or from castor oil may comprise, for instance, an unsaturated main hydrocarbon chain comprising at least 18 carbon atoms, the unsaturated bond of said main chain being spaced from either end thereof by at least 6 carbon atoms, an ether group comprising at least 12 carbon atoms attached to said main hydrocarbon chain at a point spaced from said unsaturated bond by not more than three carbon atoms, a polar group attached to one end of said main hydrocarbon chain, and a seclong chain alkyl derivatives. Also, I have prepared compounds utilizing polar groups of the alkyl sulfonate type, wherein a long alkyl chain has been substituted for the positive ion. It is, therefore, apparent that any strongly hydrophilic polyvalent polar group may be inserted in the general molecular structure indicated above, to produce satisfactory foam inhibiting substances.

My invention comprises the discovery that boiler water foam formation is best inhibited by adding thereto surface-active compounds, the molecules of which are predominantly horizontally oriented in the steam-water interface and present a complex molecular structure with multiple branch chains having spaced polar groups to which are attached long alkyl side chains. Further, I have found that strongly hydrophilic highly ionized polar groups are preferable to counterbalance the maximum number of long alkyl or hydrocarbon chains. I have also discovered that in order to bring about the greatest expansion of the gaseous type of surface film formed by these substances I can provide a main central aqueous anchorage by grouping several strongly hydrophilic polar groups in such a manner that the branch hydrocarbon chains attached to these polar groups will extend radially from this main anchorage. Side chains extending from these several branches are also provided. Molecules of this structure produce the desired maximum expansion of the gaseous film.

In my researches I have been able to prepare compounds having a varying number of polar groups in the main chain, as well as in side chains, to which polar groups are attached long alkyl or hydrocarbon chains. These compounds have proven to be effective as foam inhibiting agents. They conform to the basic principles disclosed hereinabove, providing for polar groups spaced far apart in the molecule to cause substantial horizontal orientation of the molecules of such substances in the steam-water interface. These compounds fall into the hereinbelow tabulated classes:

A. One type of organic foam inhibiting substance, according to the present invention, may be represented by the general formula

in which $n$ is an integral number not less than 6, and in which X represents any of the following hydrophilic radicals:

1. A mononuclear aroxy radical carrying one or more alkoxy groups comprising a chain of at least 8 carbon atoms. Examples of substances comprising such radicals are:

1,10-di-(meta-didodecyloxy phenyl) ether of decane

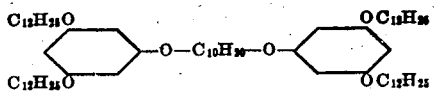

1,20-di-(para-cetyloxy-phenyl) ether of eicosane

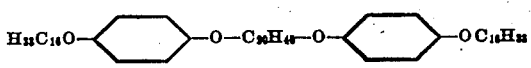

2. A mononuclear aryl radical carrying one or more alkoxy alkyl amino or aliphatic acyl groups having alkyl or hydrocarbon chains comprising at least 8 carbon atoms. Examples of substances comprising such aryl radicals are:

1,10-(meta-cetyloxy benzene) decane

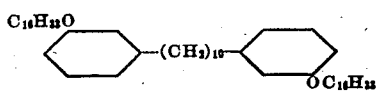

1,12-di-(sym-didodecyloxy benzene) dodecane

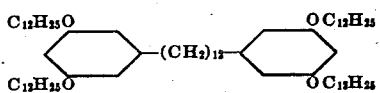

1,10-di-(meta-cetylamino benzene) decane

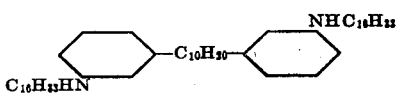

1,20-di-(sym-3,5-didodecyl amino benzene) eicosane

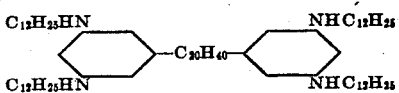

ωω' Compounds having alkoxylated aromatic radicals are adapted for the purpose of the present invention, for they are of unusual chemical stability and of relatively low volatility with steam. The same is true of aromatic radicals carrying aliphatic acyl groups.

3. A mononuclear aromatic secondary amino radical carrying one or more amino groups, at least one of which has alkyl chains comprising at least 8 carbon atoms. An example of a substance comprising such secondary aromatic amino radicals is:

1,20-di-(3,5-dicetyl-amino-phenyl amino) eicosane

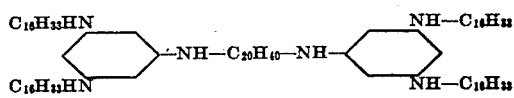

4. An alkyl amino group with an alkyl chain comprising at least 8 carbon atoms. An example of a substance comprising such mono-substituted amino groups is:

1,20-di-(cetylamino)-eicosane

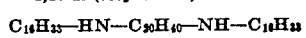

1,10-di-(cetylamino)-decane

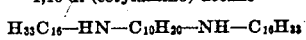

5. A chain consisting of an alkyl group joined through a nitrogen to an indefinite number of similar alkyl groups, for example:

Poly-decamethylene diamine

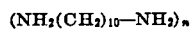

6. An alkyl diamine polymer, such as poly-1,12-octadecane diamine:

7. An alkyl diamine substituted by two alkyl groups comprising at least 8 carbon atoms, such as:

1,12-didodecyldiamino-octadecane

8. An alkoxy or aryloxy group with an alkyl chain comprising at least 8 carbon chains. Examples of substances comprising such groups are:

Dicetyl ether of decane diol

1,12-octadecandiol dicetyl ether

Obviously the two spaced polar radicals or groups designated generally by the letter X need not be similar. The following are examples of substances according to the present invention comprising two dissimilar spaced polar radicals:

1-cetyl amino-20-(3,5-didodecyloxy-phenoxy)-eicosane

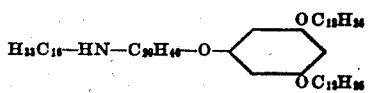

12-dodecyloxy-1-dodecylamino-9-octadecene

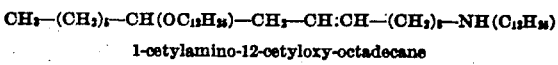

1-cetylamino-12-cetyloxy-octadecane

9. An ester radical with a hydrocarbon chain comprising at least 8 carbon atoms:

Dicetyl sebacate

1-decamethylene 1-10 di-tridecanoate

10. A quaternary radical with two or three alkyl chains comprising at least 8 carbon atoms:

1,20-eicosane di-(tricetyl ammonium bromide)

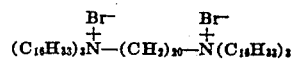

1,20-eicosane di-(dicetyl butyl phosphonium iodide)

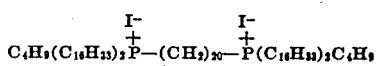

Similar compounds of sulfur, arsenic and antimony are possible.

11. Pyridinium halide with at least one alkyl chain comprising at least 8 carbon atoms:

1,10-decamethylene di-(2,6-dimethyl-4-cetyl pyridinium bromide)

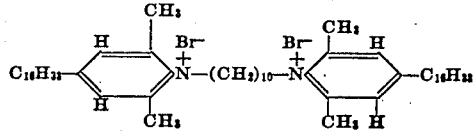

12. A sulfate or sulfonate radical with an alkyl chain comprising at least 8 carbon atoms:

1,10-decamethylene dicetyl sulfate

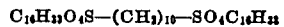

1,10-decamethylene dicetyl sulfonate

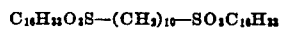

13. A sulfamate radical with an alkyl chain comprising at least 16 carbon atoms:

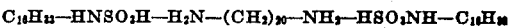

14. A thiocarbamate radical with a long alkyl chain or chains comprising at least 12 carbon atoms:

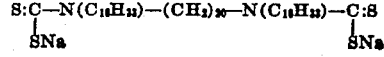

$$S:C-NH-(CH_2)_{20}-NH-C:S$$
$$|\qquad\qquad\qquad\qquad |$$
$$SC_{16}H_{33}\qquad\qquad SC_{16}H_{33}$$

The alkyl chains may be attached to both the nitrogen and the sulphur.

15. A thiocarbonate radical with a long alkyl chain comprising at least 12 carbon atoms, or with an hydrocarbon side chain comprising at least 12 carbon atoms attached to an adjacent carbon atom in the intermediate chain:

Eicosane 1,20-di(cetyl dithio-carbonate)

$$S=C-O-(CH_2)_{20}-O-C=S$$
$$|\qquad\qquad\qquad\qquad |$$
$$S(C_{16}H_{33})\qquad\qquad S(C_{16}H_{33})$$

16. A mercaptan substituted radical $$C_{12}H_{25}S-(CH_2)_{10}-SC_{12}H_{25}$$

B. Another type of foam inhibiting substance embodying the principles of the present invention may be represented by the general formulae:

$$X-(CH_2)_n-Y-(CH_2)_n-Y-(CH_2)_n-X$$
$$X-[(CH_2)_n-Y-(CH_2)_n-Y-(CH_2)_n]_m-X$$

in which the letters X and $n$ retain the significance ascribed to them hereinabove, except X may also represent an halogen, i. e., bromine; and Y represents —O—; the azo group, —N:N—; the nitrogen in a tertiary amino group —N:, or other stable polar linkages; and $m$ represents an integer of 2 or more.

Di-(10-brom decyl) ether of decamethylene glycol $$C_{16}H_{33}NH-(CH_2)_{10}-O-(CH_2)_{10}-O-(CH_2)_{10}-NHC_{16}H_{33}$$

$$C_{16}H_{33}-NH-[(CH_2)_{10}-O-(CH_2)_{10}-O-(CH_2)_{10}]_m-NHC_{16}H_{33}$$

$$Br-[(CH_2)_{10}-O-(CH_2)_{10}-O-(CH_2)_{10}]_m-Br$$

C. Yet another type of foam inhibiting substance, according to the principles of the present invention, may be represented by the general formulae:

$$X-L-(CH_2)_n-L-X$$
$$X-LR-(CH_2)_n-LR-X$$

wherein X and $n$ represent functions the same as outlined above; R represents an alkyl chain (or chains) comprising at least 8 carbon atoms, and L represents a bi or polyvalent polar group, such as a secondary amino group, —NH—; a tertiary amino group —N:; quaternary ammonium radical $$\begin{matrix}Br^-\\+\\-N:\end{matrix}$$

sulfonyl radical —SO$_2$—; azo group, —N:N—; azoxy, —N(O)N—; hydrazo, —HNNH—; sulfamate, —HSO$_3$NH—; or any combination of these polar groups.

An example of a compound of this type is furnished by:

1,20-di-(cetyl sulfonimido) eicosane $$C_{16}H_{33}-SO_2NH-(CH_2)_{20}-NHSO_2-C_{16}H_{33}$$

D. Yet another type of foam inhibiting substance according to the principles of the present invention may be represented by the general formula:

$$S-[(CH_2)_mCOO]_z-T$$

wherein $m$ represents an integral number between 8 and 15, preferably 10 to 12; $z$ represents an integral number which is equal to at least 2; S represents an hydroxy group or an alkoxy group containing at least 8 carbon atoms; and T represents hydrogen or an alkyl radical containing at least 8 carbon atoms, the molecular weight preferably ranging from approximately 375 to about 1000, although compounds having molecular weights as high as 25,000 have proved effective foam inhibitors in tests in a high pressure boiler.

An example of a compound of this type is furnished by the polymers of $\omega$-hydroxy decanoic acid:

$$HO[(CH_2)_9COO]_4H$$

In the above representative formulae it is understood that wherever straight hydrocarbon chains are indicated branch chains are in every case permissible and in many cases preferable. The many deviations that are possible by the inclusion of various branch chains are so numerous that mere mention of this provision should suffice.

The general formulae for the preferred compounds of greatest foam inhibiting effectiveness may be represented in part by the following:

$$Z_nR'$$

Wherein $n$ represents an integer not less than 2. Wherein Z represents:

9-octadecene-12-alkoxy-1-imino- (such as 9-octadecene-12-cetyloxy-1-imino-)
9-octadecene-12-alkoxy-1-alkyl imino- (such as 9-octadecene-12-cetyloxy-1-cetyl imino-)
9-octadecene-1,12-dialkyl imino- (such as 9-octadecene-1,12-dicetyl imino-)
9-octadecene-12-alkoxy-1-quaternary ammonium- (such as 9-octadecene-12-cetyloxy-1-methyl cetyl ammonium bromide-)
9-octadecene-1,12-quaternary ammonium- (such as 9-octadecene-12-methyl dicetyl ammonium bromide-1-methyl cetyl ammonium bromide-)

Any hydrocarbon chain containing at least 10 carbon atoms and having branch chains and side chains, with polar groups of the type described, spaced at regular or irregular intervals in the main chain and/or branch chains, being adjacent to or attached to long side chains, said polar groups being strongly hydrophilic. The end polar groups attached to R' should preferably be highly ionized ones in boiler water solution, such as the quaternary ammonium compounds.

Wherein R' represents:

An hydrocarbon chain of 2 or more carbons (straight or branched) with "$n$" number of halogen bonds replaced by "Z" groups in locations in the chain as far apart as possible and preferably uniformly spaced (such as tetra-(9-octadecene-12-cetyloxy-1-methyl cetyl ammonium bromide) 1,3,5,7-heptane).

A cyclic or polycyclic or an aromatic nucleus of one or more rings, with or without side chains, having "$n$" number of halogen bonds, or other replaceable bonds, replaced by "Z" groups, in locations as far apart as possible, and preferably on opposite sides of the ring or rings (such as tri-(9-octadecene-12-cetyloxy-1-imino) 1,3,5-benzene).

The above described complex surface-active organic foam inhibiting compounds are designed to produce a gaseous type of film having the greatest expansive power and manifesting maximum dynamic energy produced by the highly hydrophilic polar groups and long alkyl chains attached to or adjacent to such polar groups. Coincidental with the increased efficacy of these compounds to produce the desired exclusive and dynamic gaseous type of film, the adsorptive power of these compounds is also greatly increased. The effective "life" of these compounds in the boiler water tends to be curtailed because of the affinity of these polar groups for dispersed particles, resulting in adsorption which would progressively and seriously impair the foam inhibiting effectiveness of the compounds. Because of the reactive nature of these foam inhibiting compounds, it becomes increasingly important to use these compounds in connection with the depressants described hereinabove. Since the various types of compounds described above respond to the influence of various types of depressing agents, it becomes apparent that it will not be possible to enumerate in detail the various depressing agents that will be most effective in depressing adsorption with each of the foam inhibiting chemicals described herein, but it is obvious that anyone skilled in the art can easily determine which depressing agent will best function in connection with any particular foam inhibiting type of compound under any particular set of conditions, including concentration of electrolytes, pH values, temperature, and the like.

To one skilled in the art it would appear absurd to condition boiler water by adding thereto foam producing and foam inhibiting substances. Yet I have found that the simultaneous addition of substances having such apparently mutually frustrating effects is greatly advantageous. It results, for instance, in the prevention of the encrusting deposition of crystalline alkaline earth carbonates which normally occurs in boiler feed pipes and pumps, feed water heaters and branch pipes thereof, injectors, boiler checks, and other auxiliary boiler equipment, and in heat exchangers of various sorts. Instead, the alkaline earth carbonates are retained in the feed water in dispersed form, and, upon entering the boiler proper, are prevented from combining with silica and are flocculated as a non-crystalline sludge, easily removable by blowdown, which does not adhere to the boiler walls. Similarly, the encrusting deposition of silica on the walls of the boiler is prevented. Steam generating efficiency is also greatly increased, heat transfer coefficients being doubled or even quadrupled. Other advantages include reduction of the temperature of the boiler heating surface, reduction of stresses in boiler metal, and promotion of smoother boiling of the nucleate type with formation of initial small bubbles.

There exist considerable differences as to efficacy, stability, adsorption affinities and other characteristics, as between the various types of form inhibiting substances disclosed hereinabove and as between the individual members thereof. Those skilled in the art will at once recognize these differences and will know how to adapt any particular foam inhibiting substance to their purposes. The following remarks will serve as an additional guide to those skilled in the art, to lead them, in the light of their previous experience, to the proper application of the principles of this invention to their particular problems.

While, in general, only very minute amounts of water soluble wetting agents, such as a few parts per million, need to be added to boiler water, there is nevertheless a different effect as between various amounts. Lesser amounts serve only to prevent encrusting deposition, while larger amounts additionally effect greater steam generating efficiency.

The exact amount of water soluble wetting agent to be added depends on its potency, on the amount and potency of any foam producing substances already present in the boiler water, on the rate of removal of foam producing substances from the boiler water by the flocculation of inorganic substances, by decomposition or by volatilization with steam, and on whether only prevention of encrusting deposition or the latter effect together with increased steam generating efficiency is desired.

The foam inhibiting substances of this invention may be added as alcoholic solutions (or in other organic solvents) or emulsions, to form aqueous dispersions, in amounts from 0.2 parts per million to as much as 25 parts per million. The addition of greater amounts is possible but not economical. These additions may be made both to the feed water and by injection into the boiler, the latter at intervals, as described in my United States Patent No. 1,911,756, dependent upon the rate of loss of foam inhibiting material from the boiler by adsorption, decomposition, or volatilization, on the efficacy of the foam inhibiting substance, on the amount of water soluble wetting agent and other foam producing agents present, and like factors.

The following experiment will serve as an example illustrating the application of the principles of the present invention to a specific problem.

In this experiment, boiler water with a pronounced foaming tendency, obtained from a district traversed by the Northern Pacific Railroad, was treated in an experimental laboratory boiler having a ½ inch steam valve. The test boiler used for experimental purposes was of a vertical type, 7⅛ inches internal diameter by 30 inches high, with a 10,000 watt electrical heating unit located at the bottom of the boiler. The total capacity was approximately 20 liters. For test purposes the boiler was operated with the static water level approximately half the capacity of the boiler, or 10 liters. During tests, the rate of steam withdrawal from the boiler was varied between approximately 50 and 350 gallons per hour per square foot of water surface through which the steam bubbles emerge, which is greatly in excess of the rate encountered during maximum steam drawoff in modern locomotive boiler operation, and undoubtedly exceeds the rate encountered in any modern stationary boiler operation. In a modern locomotive the rate of steam drawoff will probably never exceed 60 gallons of water per hour per square foot of water surface through which steam bubbles emerge and the average operation of such locomotives is probably nearer 20 gallons per hour per square foot of such water surface. Therefore, it will be seen that this test procedure, wherein my chemicals completely inhibited foam formation, represented abnormal conditions of steam drawoff which probably will never be attained in practice. Therefore, these tests should indicate the very great effectiveness of my chemicals in inhibiting foam formation.

These tests were normally conducted at 200 pounds boiler pressure. The wide opening of the steam valve, of course, resulted in very rapid reduction of boiler pressure. The boiler water was consequently superheated with respect to the pressure, which tended to induce expansion of the water by spontaneous steam bubble formation throughout the mass of the water contained in the boiler.

The foaming tendency of this boiler water is indicated by the fact that approximately one-eighth turn of the steam valve caused the expansion of the water by formation and retention of steam bubbles therein, until the "light water" or foam filled the boiler. The steam withdrawal was less than ten gallons per hour per square foot of water surface.

Into such water, boiling under 200 pounds per square inch steam pressure in the laboratory boiler, was injected 0.05 gram of 1,12-octadecene dicetyl diamine in alcohol solution, or about 5 parts per million. Foaming was instantly inhibited, even when the steam valve was opened wide, representing a rate of steam withdrawal of 350 gallons per hour per square foot of water surface, such that the pressure suddenly dropped to 30 pounds per square inch. This inhibiting effect persisted for more than ten minutes and in some cases for nearly thirty minutes.

A very dilute aqueous emulsion of the same foam inhibiting substance (approximately 0.1 part per million) also completely inhibited foam formation, even when the steam valve was wide open, but foam inhibition was less lasting.

This effective foam inhibition was maintained after adding small amounts (equal to or greater than that of the foam inhibitor) of the dioctyl ester of sodium sulfosuccinate, a very efficient water soluble wetting agent. At the same time, the above disclosed advantages relating to prevention of encrusting depositions, increased heat generating efficiency, and promotion of smooth boiling were noted.

Similar results are obtained by the use of long chain fatty alcohol sulfates as water soluble wetting agents.

9-octadecene-12-cetyloxy-1-cetyl amine is even more effective as a foam inhibitor than 1,12-octadecene dicetyl diamine. When the former compound is tested as indicated in connection with 1,12-octadecene dicetyl diamine, under 200 pounds pressure, in the experimental boiler described hereinabove, but using foaming water obtained from a standard Alton locomotive, foaming is efficiently prevented for 5100 seconds, or over 80 minutes. The effectiveness of foam prevention was tested periodically by wide opening of the steam valve, to approximate a steam withdrawal of around 350 gallons per square foot per hour of steam emitting surface. This severe test indicates the great effectiveness of 9-octadecene-12-cetyloxy-1-cetyl amine as a foam inhibitor.

My invention further comprises the use of inorganic micelles added to the boiler water and/or boiler feed water, or the production of such inorganic micelles in the boiler water and/or boiler feed water, by the addition thereto of heavy metal salts, such as manganous sulfate, zirconium nitrate, and the like, or by the addition of the anionic compounds described hereinabove, such as potassium dichromate, potassium permanganate, and the like. Said inorganic micelles function as depressing agents to prevent adsorption of the foam inhibiting compounds described herein on dispersed particles in the boiler water and/or boiler feed water, whereby such foam inhibiting compounds are rendered ineffective for the purpose intended. Also, these so-called depressing agents inhibit the adsorption of the more soluble polar compounds dissolved in the boiler water and/or boiler feed water on dispersed particles.

It is further understood that these inorganic micelles or complex inorganic-organic micelles, such as lignosiliceous micelles, which are comparable in my estimation to some soil colloids encountered in boiler feed waters in certain sections of the country, may be reacted with organic foam inhibiting compounds prior to the addition thereof to the boiler water and/or boiler feed water. This would presumably result in a metathetical reaction between the polar group or groups of the organic inhibitor with polar groups of the highly hydrated micelles. The hydrophilic anchorage of the foam inhibiting compound is not destroyed in this reaction. Subsequently destruction of this necessary hydrophilic anchorage of the foam inhibitor is also prevented, for such aqueous anchorage will be shielded by the more extensive hydrophilic groups of the inorganic or inorganic-organic micelles. This conception also holds for the organic micelles such as lignin, gums and the like. The foam inhibiting chemical may be admixed with the organic substance such as lignin, or some types of tannin or dextrin, or a combination of these and other hydrophilic organic micelle compounds, to form a mixture containing approximately 10 or 15 per cent of the organic inhibitor compound. This mixture is then emulsified, preferably in a colloid mill. The resulting mixture is readily dispersed in cold boiler feed water. The resulting foam inhibiting emulsoid mixture can then be dispersed in the boiler feed water at the rate of one pound per 20,000 gallons or more of the boiler feed water, depending upon the nature and efficacy of the particular foam inhibiting chemical used, and upon the depressing agents present in the boiler water or added thereto.

Waters that are deficient in the necessary inorganic or inorganic-organic micelles of the type described can be conditioned for maximum reactivity with the foam inhibiting substances by adding to the boiler feed water the necessary heavy metal compounds, such as manganous sulfate, at the rate of 0.2 to 2 or more parts per million, depending upon the organic content of the feed water which it is desired to permanently remove from the resulting boiler water. If the boiler feed waters are deficient in soluble silica compounds, I add additional soluble silicates such as sodium silicate, together with the heavy metal compounds hereinabove specified, to produce the desirable inorganic micelles. As stated previously, I may also furnish organic micelles by adding lignin materials, easily procurable as sulfite waste liquor from paper mills, which will react to form complexes with the siliceous materials to produce micelles more desirable in connection with the foam inhibiting organic compounds forming part of the subject matter of this specification.

Compositions of matter suitable for conditioning water may be compounded from the various compounds disclosed hereinabove. Such compositions may comprise an aqueous suspension of a foam inhibiting compound such as 9-octadecene-12-cetyloxy-1-cetyl amine stabilized by a hydrophilic organic colloid material such as tannin or dextrin, and, optionally, organic or inorganic material capable of forming micelles, for instance, manganous sulfate, a soluble silicate being added, if the water used does not contain enough siliceous material to form micelles. Manganous sulfate may be used in amounts such as 10 parts or more per million. A soluble silicate may be added in amounts such as 25 parts per million.

The above disclosed general principles, together with the examples illustrating the application of said principles, show that I have invented an entirely new and greatly advantageous method of conditioning water for boiling purposes, which comprises the addition thereto both of foam producing substances, in particular water soluble wetting agents, and of foam inhibiting substances.

It will, of course, be understood that various details of the process may be varied through a wide range without departing from the principles of this invention, and it is, therefore, not the purpose to limit the patent granted hereon otherwise than necessitated by the scope of the appended claims.

I claim as my invention:

1. The method of inhibiting the formation of foam in an aqueous gas-liquid system which comprises incorporating therewith a predominantly hydrophobic organic substance comprising hydrophilic groups spaced by an intermediate hydrocarbon chain containing at least 6 carbon atoms, said hydrophilic groups having attached thereto hydrocarbon chains containing at least 8 carbon atoms.

2. The method of inhibiting the formation of foam in an aqueous gas-liquid system which comprises incorporating therewith a predominantly hydrophobic organic substance comprising hydrophilic groups spaced by an intermediate hydrocarbon chain containing at least 10 carbon atoms, each of said hydrophilic groups having attached thereto a hydrocarbon chain containing at least 8 carbon chains.

3. The method of inhibiting the formation of foam in an aqueous gas-liquid system which comprises incorporating therewith a predominantly hydrophobic organic substance comprising a main hydrocarbon chain, branch hydrocarbon chains having spaced polar groups, and hydrocarbon chains containing at least 8 carbon atoms attached to said polar groups.

4. The method of inhibiting the formation of foam in an aqueous gas-liquid system which comprises incorporating therewith a predominantly hydrophobic organic substance comprising a main hydrocarbon chain, thereto attached hydrocarbon chains having polar groups spaced by at least 10 carbon atoms, and hydrocarbon chains containing at least 16 carbon atoms attached to said polar groups.

5. The method of inhibiting the formation of foam in an aqueous gas-liquid system which comprises incorporating therewith a predominantly hydrophobic organic substance comprising a main hydrocarbon chain, thereto attached hydrocarbon chains having ether groups spaced by at least 10 carbon atoms, polar groups attached to carbon atoms positioned adjacently said ether groups, and hydrocarbon chains containing at least 16 carbons atoms attached to said polar groups.

6. The method of inhibiting the formation of foam in an aqueous gas-liquid system which comprises incorporating therewith a predominantly hydrophobic organic substance comprising a main hydrocarbon chain, unsaturated hydrocarbon chains having ether groups positioned adjacently the double bonds thereof, hydrophilic groups connecting said unsaturated chains and said main chain and spaced from said ether groups by at least 10 carbon atoms, and hydrocarbon chains containing at least 16 carbon atoms attached to said ether groups.

7. The method of inhibiting the formation of foam in an aqueous gas-liquid system which comprises incorporating therewith a reaction product of a hydrocarbon containing halogen atoms spaced by carbon atoms and an aminated aliphatic ether containing at least 16 carbon atoms.

8. The method of inhibiting the formation of foam in an aqueous gas-liquid system which comprises incorporating therewith a reaction product of a cyclic hydrocarbon containing halogen atoms spaced by carbon atoms and an aminated aliphatic ether containing at least 16 carbon atoms.

9. The method of inhibiting the formation of foam in an aqueous gas-liquid system which comprises incorporating therewith a predominantly hydrophobic organic substance comprising an aromatic mononuclear radical, spaced amino groups attached to said radical, a plurality of hydrocarbon chains comprising at least 8 carbon atoms attached to said spaced amino groups at least one hydrophilic group attached to each of said chains, and at least one hydrocarbon chain comprising at least 16 carbon atoms attached to each hydrophilic group.

10. The method of inhibiting the formation of foam in an aqueous gas-liquid system which comprises incorporating therewith a predominantly hydrophobic organic substance comprising an aromatic mononuclear radical, spaced amino groups attached to said radical, a plurality of hydrocarbon chains comprising at least 8 carbon atoms attached to said spaced amino groups, a quaternary amino group attached to each of said chains, and at least one hydrocarbon chain comprising at least 16 carbon atoms attached to each quaternary amino group.

11. The method of inhibiting the formation of foam in an equeous gas-liquid system which comprises incorporating therewith a predominantly hydrophobic organic substances representable by the formula $$X-(CH_2)_n-X$$

wherein $n$ represents an integral number not less than 6 and X represents a hydrophilic radical selected from the group consisting of mononuclear aroxy radicals carrying at least one alkoxy group having a hydrocarbon chain containing at least 8 carbon atoms, mononuclear aryl radicals carrying at least one alkoxy group containing at least 8 carbon atoms, mononuclear aryl radicals carrying at least one alkyl amino group containing at least 8 carbon atoms, mononuclear aryl radicals carrying at least one aliphatic acyl group containing at least 8 carbon atoms, mononuclear aromatic secondary amino radicals carrying at least one amino group having attached thereto an alkyl chain containing at least 8 carbon atoms, mononuclear aromatic secondary amino radicals carrying at least one primary amino group and at least one amino group having attached thereto an alkyl chain containing at least 8 carbon atoms, alkyl amino radicals containing at least 8 carbon atoms, ether radicals containing at least 8 carbon atoms, ester radicals containing at least 8 carbon atoms, quaternary amino radicals containing at least 2 hydrocarbon chains each containing at least 12 carbon atoms, pyridinium radicals comprising a hydrocarbon chain with at least 16 carbon atoms, sulfate radicals containing hydrocarbon chain with at least 12 carbon atoms, sulfonate radicals containing a hydrocarbon chain with at least 8 carbon atoms, and sulfamate radicals comprising an alkyl chain with at least 8 carbon atoms.

12. The method of inhibiting the formation of foam in an aqueous gas-liquid system which comprises incorporating therewith a predominantly hydrophobic organic substance representable by the formula $$Z_nR$$

wherein $n$ represents an integer not less than 2, Z represents a radical selected from the groups consisting of the 9-octadecene-12-alkoxy-1-imino, 9 - octadecene - 12 - alkoxy - 1 - alkyl imino, 9-octadecene-1, 12 - dialkyl imino, 9 - octadecene-1, 12 - dialkoxy, 9 - octadecene - 12 - alkoxy - 1 - quaternary ammonium, and 9 - octadecene-1,12 quaternary ammonium radicals and wherein R represents a hydrocarbon radical selected from the group consisting of alkyl chains comprising at least 2 carbon atoms and cyclic hydrocarbons, said polar radicals being attached to said hydrocarbon radicals at points spaced uniformly apart.

13. The method of inhibiting the formation of foam in an aqueous gas-liquid system which comprises incorporating therewith 1,12-octadecene-dicetyl-diamine.

14. The method of inhibiting the formation of foam in an aqueous gas-liquid system which comprises incorporating therewith a predominantly hydrophobic organic substance comprising a main hydrocarbon chain, unsaturated hydrocarbon chains having polar groups positioned adjacently the double bonds thereof, hydrophilic groups connecting said unsaturated chains and said main chain and spaced from said polar groups by at least 10 carbon atoms, and hydrocarbon chains containing at least 16 carbon atoms attached to said polar groups.

15. The method of inhibiting the formation of foam in an aqueous gas-liquid system which comprises incorporating therewith a predominantly hydrophobic organic substance comprising an unsaturated main hydrocarbon chain comprising at least 18 carbon atoms, the unsaturated bond of said main hydrocarbon chain being spaced from either end thereof by at least 6 carbon atoms, an ether group comprising at least 12 carbon atoms attached to said main hydrocarbon chain at a point spaced from said unsaturated bond by not more than 3 carbon atoms, a polar group attached to one end of said main hydrocarbon chain, and a second hydrocarbon chain comprising at least 12 carbon atoms attached to said polar group.

16. The method of inhibiting the formation of foam in an aqueous gas-liquid system which comprises incorporating therewith a predominantly hydrophobic organic substance comprising an unsaturated main hydrocarbon chain comprising at least 18 carbon atoms, the unsaturated bond of said main hydrocarbon chain being spaced from either end thereof by at least 6 carbon atoms, a polar group attached to said main hydrocarbon chain at a point spaced from said unsaturated bond by not more than 3 carbon atoms, a second hydrocarbon chain comprising at least 12 carbon atoms attached to said polar group, a second polar group attached to one end of said main hydrocarbon chain, and a third hydrocarbon chain comprising at least 12 carbon atoms attached to said second polar group.

17. The method of inhibiting the formation of foam in an aqueous gas-liquid system which comprises incorporating 9-octadecene-12-cetyloxy-1-cetyl amine therewith.

18. The method of conditioning water against foaming at atmospheric pressure which comprises incorporating with said water a predominantly hydrophobic surface-active organic substance comprising spaced polar groups, a hydrocarbon chain intermediate said polar groups having at least 6 carbon atoms, and short alkyl chains attached to said polar groups.

19. The method of inhibiting the formation of foam in an aqueous gas-liquid system which comprises incorporating therewith a predominantly hydrophobic organic substance comprising an unsaturated main hydrocarbon chain comprising at least 18 carbon atoms, the unsaturated bond of said main hydrocarbon chain being spaced from either end thereof by at least 6 carbon atoms, an ether group comprising at least 12 carbon atoms attached to said main hydrocarbon chain at a point spaced from said unsaturated bond by not more than 3 carbon atoms, and a polar group attached to one end of said main hydrocarbon chain.

20. The method of inhibiting the formation of foam in an aqueous gas-liquid system which comprises incorporating therewith a predominantly hydrophobic organic substance comprising an unsaturated main hydrocarbon chain comprising at least 18 carbon atoms, the unsaturated bond of said main hydrocarbon chain being spaced from either end thereof by at least 6 carbon atoms, a polar group attached to said main hydrocarbon chain at a point spaced from said unsaturated bond by not more than 3 carbon atoms, a second hydrocarbon chain comprising at least 12 carbon atoms attached to said polar group, and a second polar group attached to one end of said main hydrocarbon chain.

21. The method of conditioning water for steam generation which comprises incorporating therewith a predominantly hydrophobic surface active organic substance comprising a plurality of spaced hydrophilic nitrogen containing radicals interconnected and spaced by at least 6 carbon atoms and having a plurality of hydrocarbon chains containing each at least eight carbon atoms attached severally to said nitrogen containing radicals.

LEWIS O. GUNDERSON.

REFERENCES CITED

The following references are of record in the file of this patent:

UNITED STATES PATENTS

| Number | Name | Date |
|---|---|---|
| Re. 19,719 | Hall | Oct. 8, 1935 |
| Re. 20,490 | McLean et al. | Aug. 31, 1937 |
| 556,021 | Nieske | Mar. 10, 1896 |
| 567,919 | Royle | Sept. 15, 1896 |
| 1,173,698 | Block | Feb. 29, 1916 |
| 1,235,815 | Kriegsheim | Aug. 7, 1917 |
| 1,269,006 | Schwerin | June 11, 1918 |
| 1,717,905 | Alsberg | June 18, 1929 |
| 1,759,615 | Hall | May 20, 1930 |
| 1,892,857 | Spellmeyer | Jan. 3, 1933 |
| 1,901,321 | Munz | Mar. 14, 1933 |
| 1,903,041 | Hall et al. | Mar. 28, 1933 |
| 1,957,513 | Wolfson | May 8, 1934 |
| 1,964,641 | Mathias | June 26, 1934 |
| 1,979,469 | Johnson | Nov. 6, 1934 |
| 2,023,755 | Weihe | Dec. 10, 1935 |
| 2,045,551 | Iddings et al. | June 23, 1936 |
| 2,074,380 | Flett | Mar. 23, 1937 |
| 2,092,913 | Fiske | Sept. 14, 1937 |
| 2,097,121 | Fromm | Oct. 26, 1937 |
| 2,127,490 | Flaxman | Aug. 16, 1938 |
| 2,264,103 | Tucker | Nov. 25, 1941 |
| 2,304,805 | Denman | Dec. 15, 1942 |

FOREIGN PATENTS

| Number | Country | Date |
|---|---|---|
| 449,275 | Great Britain | June 24, 1936 |